(12) United States Patent
Lee

(10) Patent No.: US 8,197,247 B2
(45) Date of Patent: Jun. 12, 2012

(54) INJECTION MOLD PLATE MODULE HAVING SWITCHABLE SUB-RUNNERS

(75) Inventor: Hsin-Ho Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/850,638

(22) Filed: Aug. 5, 2010

(65) Prior Publication Data

US 2011/0262578 A1  Oct. 27, 2011

(30) Foreign Application Priority Data

Apr. 22, 2010  (TW) .................................... 99112641

(51) Int. Cl.
*B29C 45/32* (2006.01)
(52) U.S. Cl. .......................... 425/562; 425/577; 425/588
(58) Field of Classification Search .................. 425/562, 425/563, 564, 565, 566, 572, 588
See application file for complete search history.

(56) References Cited

U.S. PATENT DOCUMENTS

| | | | | |
|---|---|---|---|---|
| 4,337,027 A | * | 6/1982 | Montieth | 425/562 |
| 4,909,725 A | * | 3/1990 | Ward | 425/562 |
| 5,208,053 A | * | 5/1993 | Vandenberg | 425/572 |
| 7,597,836 B2 | * | 10/2009 | Lin | 264/328.8 |

* cited by examiner

*Primary Examiner* — Timothy Heitbrink
(74) *Attorney, Agent, or Firm* — Altis Law Group, Inc.

(57) ABSTRACT

A mold plate module includes a mold plate and an inserting block. The mold plate includes a first surface, a blind hole defined in the first surface, a through hole defined in a bottom surface of the mold plate in the blind hole, two mold cavities, and two first sub-runners. The two first sub-runners are defined in the first surface, and connect the corresponding mold cavities to the blind hole. The inserting block includes a second surface, a lateral surface, a block through hole defined in the second surface, and at least one second sub-runner defined in the second surface. The at least one second sub-runner communicates with the block through hole and extends toward and terminating at the lateral surface. The inserting block is detachably received in the blind hole and rotatable relative to the mold plate to switchingly couple the at least one second sub-runner with the first sub-runners.

18 Claims, 5 Drawing Sheets

INJECTION MOLD PLATE MODULE HAVING SWITCHABLE SUB-RUNNERS

BACKGROUND

1. Technical Field

The disclosure generally relates to a mold plate, and particularly, to an injection mold using the mold plate.

2. Description of Related Art

An injection mold may wear out during operation, and a runner of the injection mold may get blocked. When the runner is blocked, plastic cannot flow through the runner to a number of cavities to mold the workpiece, such as lenses. In that case, some molding component of the injection mold, such as a molding plate will need to be replaced. However, replacement of the molding component is expensive.

Therefore, what is needed is an injection mold that can overcome the described limitations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present injection mold. Moreover, in the drawings, all the views are schematic, and like reference numerals designate corresponding parts throughout the several views.

DETAILED DESCRIPTION OF EMBODIMENTS

Embodiments of the mold plate module and the injection mold using the mold plate module will now be described in detail below and with reference to the drawings.

Figure 1:
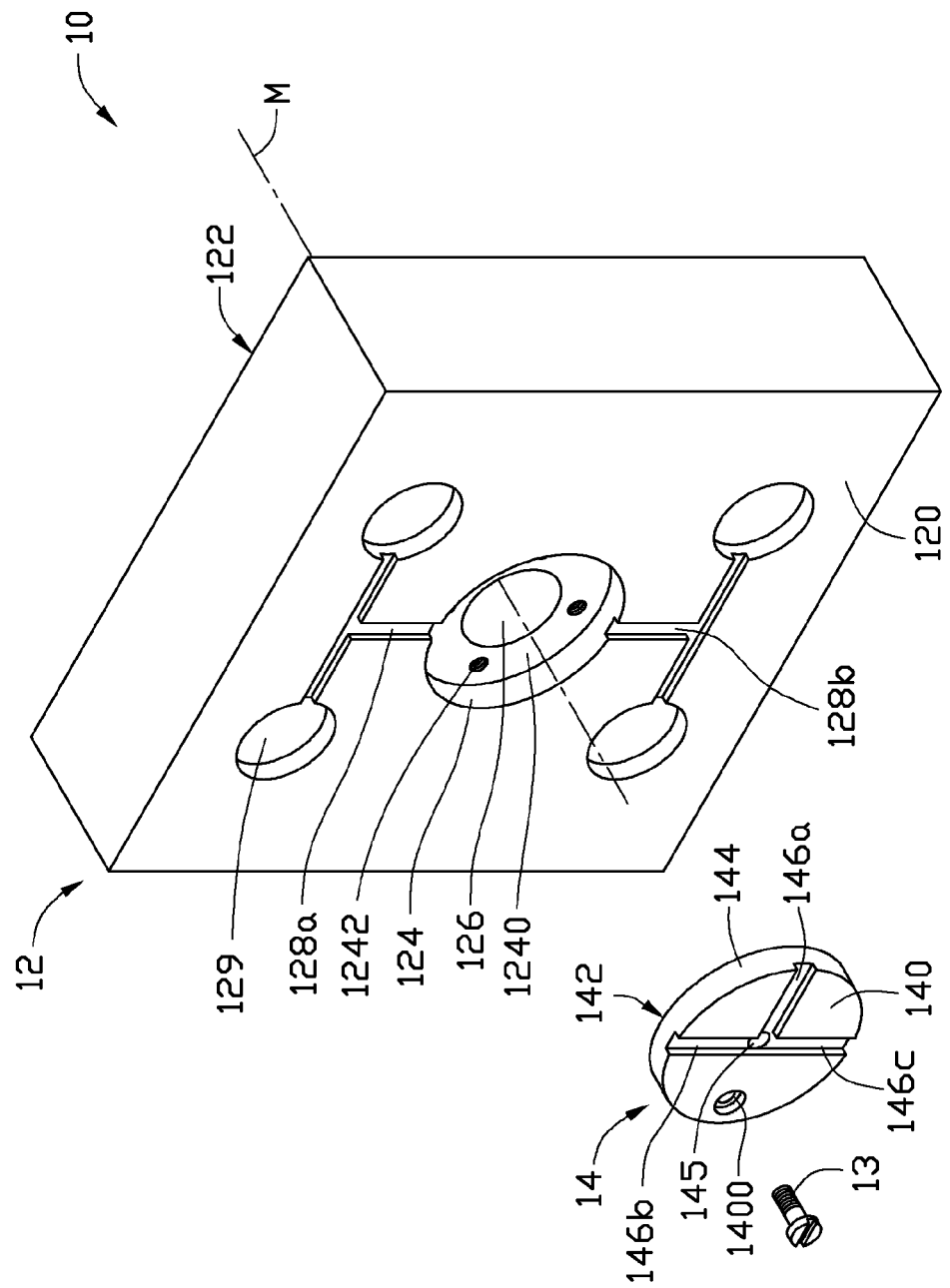
FIG. 1 is an isometric and disassembled view of a mold plate module, in accordance with one embodiment.

Referring to FIG. 1, a mold plate module 10 in accordance with one embodiment is shown. The mold plate module 10 includes a mold plate 12 and an inserting block 14.

In this embodiment, the mold plate 12 is generally cuboid-shaped, and includes a first top surface 120 and a first bottom surface 122 at opposite sides thereof. The mold plate 12 has a blind hole 124 defined in the first top surface. The mold plate 12 includes a bottom surface 1240 in the blind hole 124, and the mold plate 12 has a through hole 126 defined in the bottom surface 1240. The through hole 126 communicates with the blind hole 124, and extends all the way through the first bottom surface 122. In this embodiment, the blind hole 124 and the through hole 126 are cylindrical. A diameter of the blind hole 124 is greater than that of the through hole 126. In addition, the blind hole 124 is coaxially aligned with the through hole 126. The mold plate 12 has a central axis M coaxial with the axes of the blind hole 124 and the through hole 126.

The mold plate 12 has two first sub-runners 128a and 128b defined in the first top surface 120. The two first sub-runners 128a and 128b each communicate with the blind hole 124, and are located at two opposite sides of the central axis M. In this embodiment, the two first sub-runners 128a and 128b are symmetrically opposite to each other across the central axis M. Each of the first sub-runners 128a and 128b has a T-shaped distribution. In alternative embodiments, each of the two first sub-runners 128a and 128b may have another suitable distribution, such as a crossing distribution.

The mold plate 12 has four cavities 129 defined in the first top surface 120. In this embodiment, two cavities 129 are located adjacent to a portion of the first sub-runner 128a facing away from the blind hole 124. The other two cavities 129 are located adjacent to a portion of the other first sub-runner 128b facing away from the blind hole 124. The four cavities 129 communicate with the respective two first sub-runners 128, and are configured for molding workpieces, such as lenses. The number of the cavities 129 is not limited to the above illustrated embodiment. In alternative embodiments, the mold plate 12 may have two, four, six, or another suitable number of cavities 129 defined in the first top surface 120.

A configuration of the inserting block 14 is shaped to conform to that of the blind hole 124. In this embodiment, the inserting block 14 has a substantially cylindrical shape, or a substantially disc shape. The inserting block 14 includes a second top surface 140 and a second bottom surface 142 at opposite sides thereof, and a lateral surface 144. The second top surface 140 and the second bottom surface 142 are each round. The lateral surface 144 is located between and adjoins the second top surface 140 and the second bottom surface 142. In addition, the lateral surface 144 surrounds the second top surface 140 and the second bottom surface 142.

The inserting block 14 has a through hole 145 and three second sub-runners 146a, 146b, and 146c defined in the second top surface 140. In this embodiment, the through hole 145 is defined in a center of the second top surface 140. The three second sub-runners 146a, 146b, and 146c each communicate with the through hole 145 and extend toward and terminate at the lateral surface 144. The second sub-runners 146b and the second sub-runners 146c are aligned along a line passing through the center of the second top surface 140, and the second sub-runner 146a is perpendicular to the two aligned second sub-runners 146b and 146c.

Figure 2:
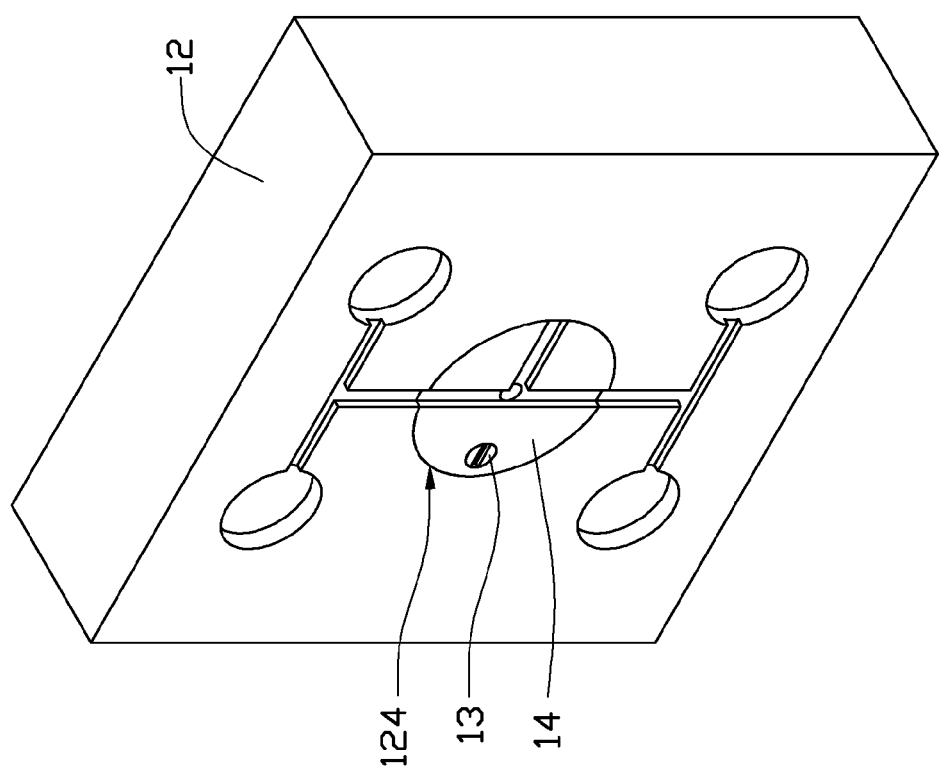
FIG. 2 is an isometric and assembled view of the mold plate module of FIG. 1.

Referring also to FIG. 2, the inserting block 14 can be detachably received in the blind hole 124. In this embodiment, the mold plate 12 has a number of first fixing holes 1242 defined in the bottom surface 1240. The inserting block 14 has a second fixing hole 1400 defined in the second top surface 140. A screw 13 is provided to pass through the second fixing hole 1400 and one of the first fixing holes 1242, thus fixing the inserting block 14 to the mold plate 12.

Figure 3:
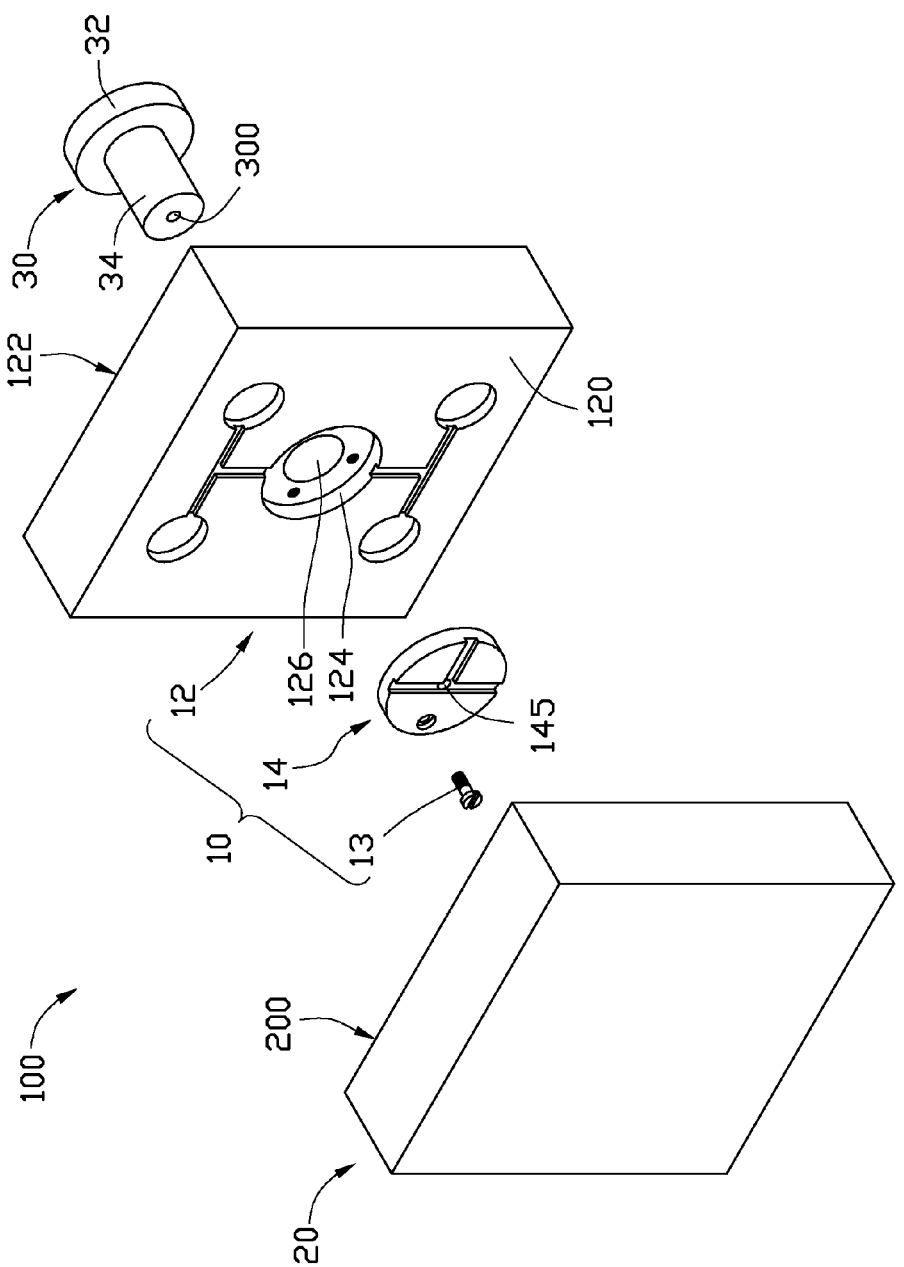
FIG. 3 is an isometric and disassembled view of an injection mold using the mold plate module of FIG. 1.

Referring to FIG. 3, an injection mold 100 using the mold plate module 10 is also provided. The injection mold 100 includes the mold plate module 10, a supporting plate 20, and a sprue bushing 30.

The supporting plate 20 has a shape similar to that of the mold plate 12. In this embodiment, the supporting plate 20 is generally cuboid-shaped, and includes an end surface 200.

The sprue bushing 30 includes a base portion 32 and a protruding portion 34 protruding from the base portion 32. The base portion 32 and the protruding portion 34 each have a cylindrical shape. In this embodiment, the base portion 32 and the protruding portion 34 are coaxially aligned with each other. A diameter of the base portion 32 is greater than that of the protruding portion 34. The diameter of the protruding portion 34 is generally same as that of the through hole 126 of the inserting block 14. The sprue bushing 30 has a sprue 300 defined in an axial direction thereof.

In assembly, the inserting block 14 is fixed into the blind hole 124 of the mold plate 12 by the screw 13. The supporting plate 20 abuts against the mold plate 12 with the end surface 200 contacting with the first top surface 120. The protruding portion 34 of the sprue bushing 30 is inserted in the through hole 126 of the mold plate 12. Thus, the sprue 300 of the sprue bushing 30 aligns with the through hole 145 of the inserting block 14.

Figure 4:
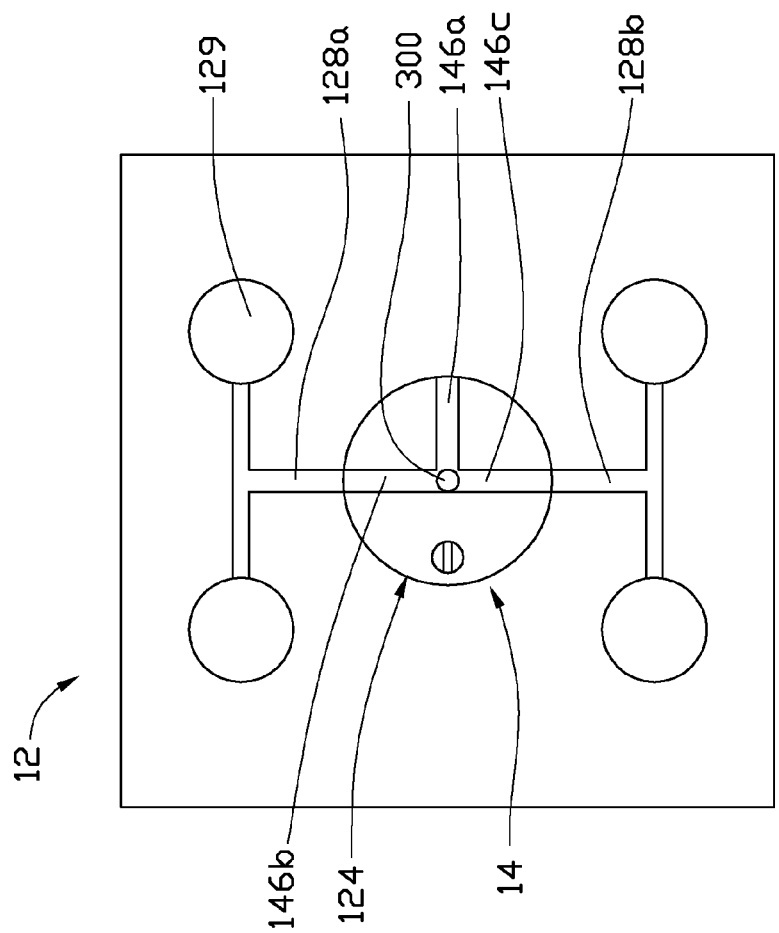
FIG. 4 is a schematic view of the injection mold operating in a first working state.
Figure 5:
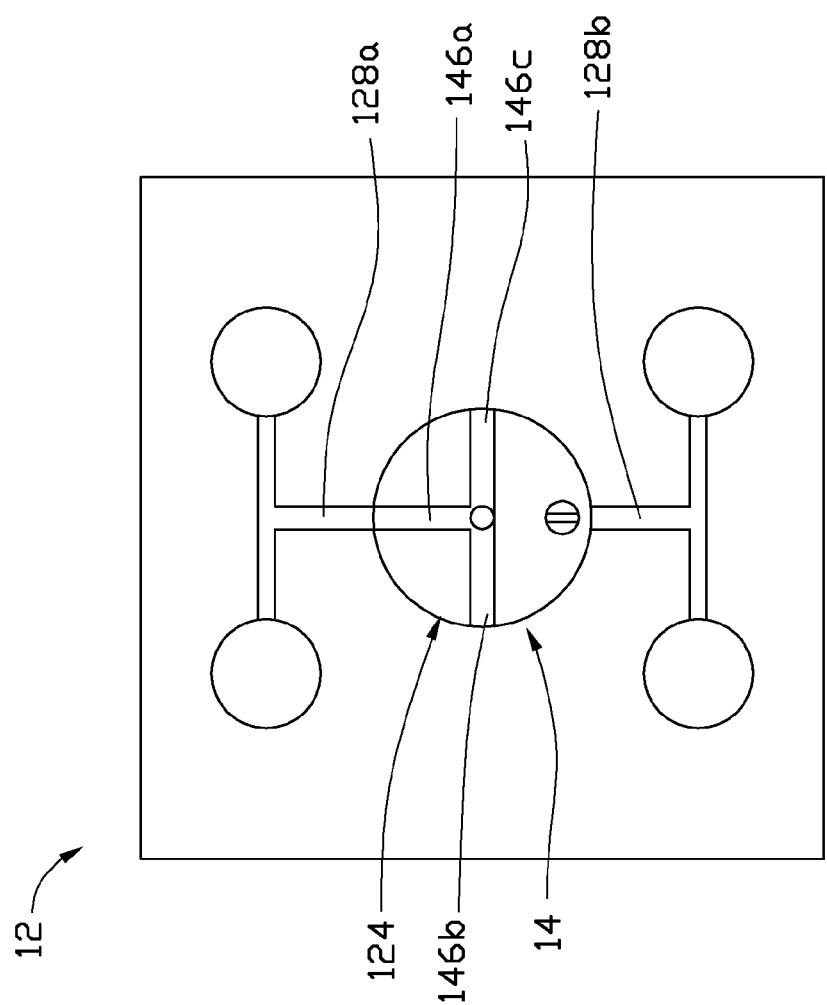
FIG. 5 is a schematic view of the injection mold operating in a second working state.

Referring also to FIGS. 4 and 5, the injection mold 100 may have different working states. In one typical example, the injection mold 100 operates at the first working state. The two first sub-runners 128a and 128b operate normally, and the inserting block 14 is located in a first position. The two aligned second sub-runners 146b and 146c align with the two respective first sub-runners 128a and 128b. The sprue 300 communicates with the two first sub-runners 128a and 128b through the two aligned second sub-runners 146b and 146c. In operation of the injection mold 100, plastic is heated and introduced to the sprue 300. The plastic flows in sequence through the two second sub-runners 146b and 146c and the two first sub-runners 128a and 128b to the four cavities 129. Thus, four lenses are molded when the plastic is cooled and solidified. When the plastic flows through the other second sub-runner 146c which is perpendicular to the two aligned second sub-runners 146b and 146c, the plastic is blocked by a peripheral side surface of the mold plate 12 in the blind hole 124.

Referring to FIG. 5, in another example, the injection mold 100 operates at the second working state. The first sub-runner 128a operates normally, and the first sub-runner 128b may operate abnormally. For example, the first sub-runner 128b may be blocked, and the plastic may not flow through the first sub-runner 128b fluently. In that case, the inserting block 14 can be rotated in the blind hole 124 relative to the mold plate 12 to a second position. When the inserting block 14 is located at the second position, the second sub-runner 146a aligns with the first sub-runners 128a. The sprue 300 communicates with the first sub-runners 128a through the second sub-runner 146a. In operation, the plastic flows in sequence through the second sub-runner 146a and the first sub-runners 128a to the two cavities 129. Thus, two lenses are molded when the plastic is cooled and solidified. When the plastic flows through the aligned second sub-runners 146b and 146c, the plastic also is blocked by a peripheral side surface of the mold plate 12 in the blind hole 124.

The number and distribution of the second sub-runners 146a, 146b, and 146c can be varied when needed, and is not limited to the above embodiment. In alternative embodiments, the inserting block 14 may have only one second sub-runner 146a or two second sub-runners 146b and 146c defined in the second top surface 140. When the inserting block 14 has two second sub-runners 146b and 146c defined in the second top surface 140, the two second sub-runners 146b and 146c may be substantially perpendicular to each other. With this configuration, the two second sub-runners 146b and 146c can be used to selectively communicate one of the two first sub-runners 128a and 128b to the sprue 300.

One advantage of the injection mold 100 is that the position of the inserting block 14 can be rotated relative to the mold plate 12, thus each of the first sub-runners 128a can be fully used. In this embodiment, the mold plate module 10 is not necessary to be replaced if one of the first sub-runners 128a or 128b operates normally. Therefore, the cost for displacing the mold plate 12 is saved.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A mold plate module comprising;
   a mold plate comprising a first surface, a blind hole defined in the first surface, a through hole defined in a bottom surface of the mold plate in the blind hole and in communication with the blind hole, two mold cavities, and two first sub-runners defined in the first surface connecting the corresponding mold cavities to the blind hole, the first sub-runners being located at opposite sides of the blind hole; and
   an inserting block comprising a second surface and a lateral surface, a block through hole defined in the second surface to allow flow of molding material and two second sub-runners and a third sub-runner defined in the second surface, the lateral surface adjoining and surrounding the second surface, the two second sub-runners and the third sub-runner communicating with the block through hole and extending toward and terminating at the lateral surface, the two second sub-runners being aligned along a line passing through the center of the second surface, and the third sub-runner being distinctly oriented from the two second sub-runners, the inserting block being detachably received in the blind hole and rotatable relative to the mold plate to switchingly couple the at least one second sub-runner with the first sub-runners, the inserting block having a first position in which the two second sub-runners are respectively in communication with the two first sub-runners, and a second position in which the third sub-runner is in communication with one of the first sub-runners and the lateral surface of the inserting block blocks the other one of the first sub-runners.

2. The mold plate module of claim 1, wherein the blind hole is cylindrical shaped, and a configuration of the inserting block is shaped to conform to that of the blind hole.

3. The mold plate module of claim 2, wherein the block through hole is defined in a center of the second surface.

4. The mold plate module of claim 2, wherein the through hole is cylindrical shaped, and a diameter of the through hole is less than that of the blind hole.

5. An injection mold comprising:
   a mold plate module comprising:
      a mold plate comprising a first surface, a blind hole defined in the first surface, a through hole defined in a bottom surface of the mold plate in the blind hole, and two first sub-runners defined in the first surface connected to the blind hole; and
      an inserting block comprising a second surface and a lateral surface, a block through hole defined in the second surface to allow flow of molding material and at least one second sub-runner defined in the second surface, the lateral surface adjoining and surrounding the second surface, the at least one second sub-runner communicating with the block through hole and extending toward and terminating at the lateral surface and, the inserting block being detachably received in the blind hole and rotatable relative to the mold plate to switchingly couple the at least one second sub-runner with the first sub-runners;
   a supporting plate, the supporting plate and the mold plate cooperatively forming two mold cavities communicating with the corresponding first sub-runners; and
   a sprue bushing comprising a sprue, the sprue bushing received in the blind hole with the sprue communicating with the block through hole.

6. The injection mold of claim 5, wherein the blind hole is cylindrical shaped, and a configuration of the inserting block is shaped to conform to that of the blind hole.

7. The injection mold of claim 6, wherein the block through hole is defined in a center of the second surface.

8. The injection mold of claim 7, wherein the first sub-runners are located at opposite sides of the blind hole, and the at least one second sub-runner includes three second sub-runners, two of the three second sub-runners are aligned along a line passing through the center of the second surface, and the other second sub-runner is distinctly oriented from the two aligned second sub-runners.

9. The injection mold of claim 6, wherein the through hole is cylindrical shaped, and a diameter of the through hole is less than that of the blind hole.

10. A mold assembly comprising:
a mold plate having a first through hole and a plurality of molding cavity recesses;
a sprue bushing inserted in the first through hole, the sprue bushing comprising a sprue for introducing molding material into the molding cavity recesses;
a blind hole defined in the mold plate and communicating with the first through hole;
a plurality of first sub-runners each having a first end connected to the corresponding molding cavity recess and an opposing second end connected to the blind hole; and
a cavity switching block comprising a second through hole, and at least one second sub-runner, the second through hole having a first end coupled to the sprue and an opposing second end connected to the at least one second sub-runner, the cavity switching block being engagingly received in the blind hole and rotatable relative to the mold plate to switchingly couple at least one of the first sub-runners to the at least one second sub-runner, thereby allowing the molding material to be introduced into the corresponding molding cavity recess.

11. The mold assembly of claim 10, wherein the plurality of first sub-runners consist of two first sub-runners, and the at least one second sub-runner includes two second sub-runners and a third sub-runner, the two second sub-runners configured for simultaneously connecting to the respective first sub-runners.

12. The mold assembly of claim 11, wherein the cavity switching block has a first position in which the two second sub-runners respectively connect to the two first sub-runners, and a second position in which the third sub-runner connects to one of the first sub-runners and the inserting block blocks the other one of the first sub-runners.

13. The mold assembly of claim 12, wherein the mold plate has two first fixing holes, the cavity switching block having a second fixing hole spanning through the cavity switching block, the mold assembly further comprising a screw, the screw passing through the second fixing hole and one of the first fixing holes to fix the cavity switching block to the mold plate at the first position, or the screw passing through the second fixing hole and the other one of the first fixing holes to fix the cavity switching block to the mold plate at the second position.

14. The mold plate module of claim 1, wherein the third sub-runner is perpendicular to the two aligned second sub-runners.

15. The mold plate module of claim 1, wherein the mold plate has two first fixing holes defined in the bottom surface, the inserting block having a second fixing hole defined in the second surface spanning through the inserting block, the mold plate module further comprising a screw, the screw passing through the second fixing hole and one of the first fixing holes, thus fixing the inserting block to the mold plate at the first position, or the screw passing through the second fixing hole and the other one of the first fixing holes, thus fixing the inserting block to the mold plate at the second position.

16. The injection mold of claim 8, wherein the two aligned second sub-runners are perpendicular to the other second sub-runner.

17. The injection mold of claim 8, wherein the inserting block has a first position in which the two aligned second sub-runners are respectively in communication with the two first sub-runners, and a second position in which the other second sub-runner is in communication with one of the first sub-runners and the lateral surface of the inserting block blocks the other one of the first sub-runners.

18. The injection mold of claim 17, wherein the mold plate has two first fixing holes defined in the bottom surface, the inserting block having a second fixing hole defined in the second surface spanning through the inserting block, the mold plate module further comprising a screw, the screw passing through the second fixing hole and one of the first fixing holes to fix the inserting block to the mold plate at the first position, or the screw passing through the second fixing hole and the other one of the first fixing holes to fix the inserting block to the mold plate at the second position.

* * * * *